(12) United States Patent
Thimbleby

(10) Patent No.: US 12,468,682 B2
(45) Date of Patent: Nov. 11, 2025

(54) CONFLICT-FREE GRAPHS OF DISTRIBUTED DATA STRUCTURES

(71) Applicant: Apple Inc., Cupertino, CA (US)

(72) Inventor: William J. Thimbleby, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 233 days.

(21) Appl. No.: 17/492,531

(22) Filed: Oct. 1, 2021

(65) Prior Publication Data

US 2022/0391381 A1 Dec. 8, 2022

Related U.S. Application Data

(60) Provisional application No. 63/197,223, filed on Jun. 4, 2021.

(51) Int. Cl.
*G06F 16/23* (2019.01)
*G06F 16/27* (2019.01)

(52) U.S. Cl.
CPC .......... *G06F 16/2365* (2019.01); *G06F 16/27* (2019.01)

(58) Field of Classification Search
CPC .. G06F 16/2365; G06F 16/9024; G06F 16/27; G06F 16/273; G06F 16/275; G06F 16/278

USPC ........................................................ 707/620
See application file for complete search history.

(56) References Cited

U.S. PATENT DOCUMENTS

| | | | | |
|---|---|---|---|---|
| 2016/0357377 A1* | 12/2016 | Thimbleby | ........... | G06F 40/166 |
| 2016/0357496 A1* | 12/2016 | Thimbleby | ........... | G06F 3/1423 |
| 2016/0357720 A1* | 12/2016 | Thimbleby | .......... | G06Q 10/101 |
| 2020/0412795 A1* | 12/2020 | Lucco | ..................... | H04L 67/10 |
| 2021/0109665 A1 | 4/2021 | Thimbleby | | |

* cited by examiner

*Primary Examiner* — Michael Pham
(74) *Attorney, Agent, or Firm* — BAKERHOSTETLER

(57) ABSTRACT

A device implementing a system for obtaining a consistent state of data based on data updates made on different devices includes a processor configured to generate, for a first data update, a first data model including first data nodes, each including a first identifier and a first data value corresponding to one of first data objects. The processor is configured to receive from a second device, for a second data update to the data, the second update being independent of the first update, a second data model including second data nodes, each including a second identifier and a second data value corresponding to one of second data objects. A consistent data model is obtained by merging the first and second data values with the same identifier, and then merging the first and second data models, and generating a final update of the data based on the consistent data model.

20 Claims, 9 Drawing Sheets

CONFLICT-FREE GRAPHS OF DISTRIBUTED DATA STRUCTURES

CROSS REFERENCE TO RELATED APPLICATIONS

This application claims the benefit of priority to U.S. Provisional Patent Application No. 63/197,223, entitled "Conflict-Free Graphs of Distributed Data Structures," filed on Jun. 4, 2021, the disclosure of which is hereby incorporated herein in its entirety.

TECHNICAL FIELD

The present description relates generally to managing data structures including, for example, merging and synchronizing replicated data structures in a conflict-free manner to obtain a consistent data structure.

BACKGROUND

Some techniques for synchronizing concurrent data updates (e.g., across multiple devices or across multiple instances of a same application) may employ replicated data structures, such as conflict-free replicated data types (CRDTs). For example, a CRDT is a data structure which represents updates to data and which can be replicated across different devices on which the data is being updated. Reflecting updates to the data, the replicated CRDTs or replicas are updated independently and concurrently without coordination between the replicas. To synchronize data updates, the updates to the replicas are merged such that the merged CRDT represents a final combined state of all data updates from the various devices.

However, in such data synchronization techniques, the resulting combined states at some of the various devices can be inconsistent with the resulting combined states at others of the various devices.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
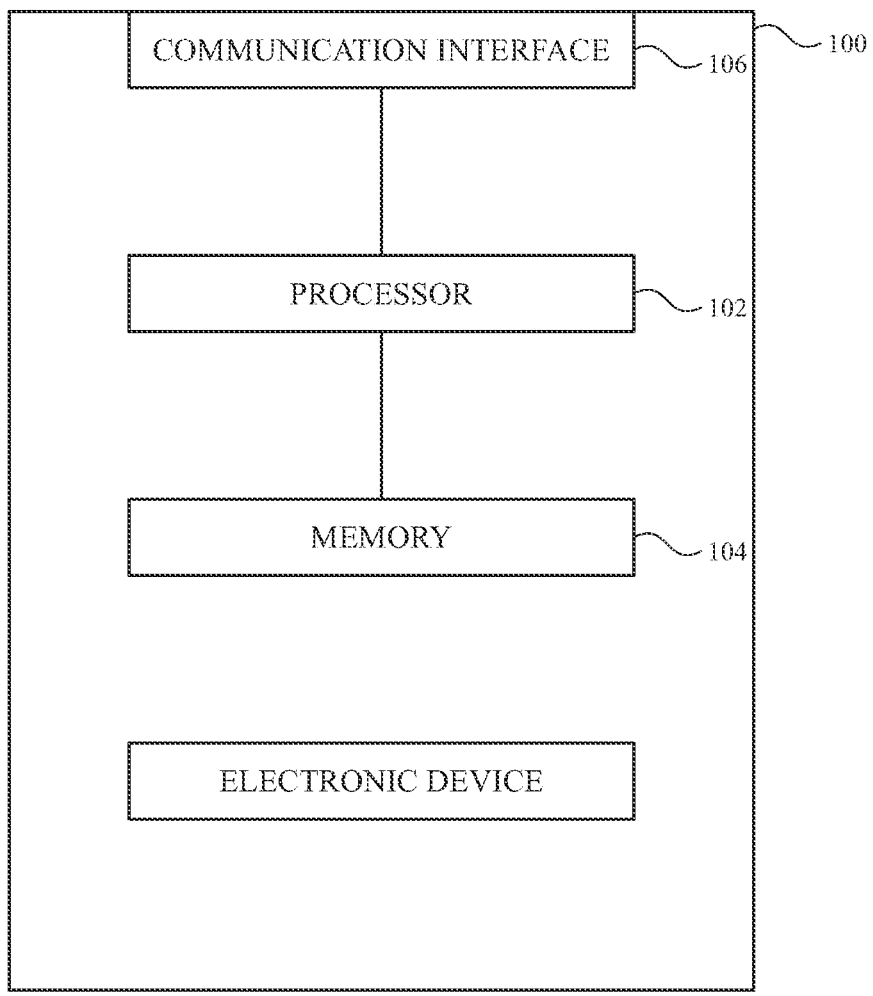
FIG. 1 illustrates an example electronic device that may implement a system for obtaining a consistent state of data provided to an application based on updates to the data made on different devices in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Collaborative or concurrent editing of an electronic document or file (e.g., a word processing document, a note page, a contacts list, an events list, a sketch, a content page, etc.) may be carried out by multiple users from multiple electronic devices or by the same user using multiple devices. The edits may be entered at different devices at the same time or at different times. Sometimes, edits received at different devices may coexist and be non-interfering of one another in a merged document; at other times, edits received at different devices may affect the same portion of the document and raise a conflict in a merged document. Conflicting edits may be entered concurrently or at different times. Sometimes, collaborating devices are located in proximity to one another such that near-range communication (e.g., communication via Bluetooth or Infrared communication interfaces) may occur between the devices without using a Wide Area Network (WAN) or Local Area Network (LAN). Sometimes, collaborating devices are located remotely from one another, and communicate with one another via a LAN or a WAN, or some other long-range network.

As noted above, synchronizing concurrent data updates to the same electronic document or file can employ replicated data structures, such as CRDTs. To synchronize data updates, the replicas may be merged such that the merged CRDT represents a final combined state of all data updates from the various devices. However, in such data synchronization techniques, each type of data (e.g., text, images, drawings, etc.) in the document, which is being concurrently or collaboratively updated, may be represented by its respective CRDT that is independent of and unrelated to a CRDT of any other type of data. Alternatively, different instances of a same data type may be represented using separate CRDTs. For example, in an address book or contacts application, each unique contact entry (including name, phone number, etc.) in the address book may be represented by a separate and independent CRDT. To combine all the changes made to data of each data type or each instance of a same data type, the replica CRDTs of that data type or instance of data type are merged independent of the merging of the replica CRDTs of the other data types or instances.

Accordingly, while updates to each of many data objects (e.g., text, images, drawings, etc.) are synchronized based on merging replicas of its corresponding CRDT, the data file containing these diverse data objects is not synchronized as a whole. As such, the local copies of the data file at different devices after the synchronization process may not be the same or consistent. Thus, in addition to using the replicated data structures (such as CRDTs) for merging updates to individual data objects (e.g., of different types) in a data file, it may be desirable to be able to provide a data model to represent the data file as a whole.

Aspects of the subject system provide for a new data structure in which a data file containing multiple data objects of various different types (e.g., text, drawings, sketch, etc.) or of the same type (e.g., contacts in an address book application) is represented by a data model in the form of a rooted directed graph. The data model or the directed graph includes a root node and children data nodes. The root node may be an observed-remove set and identifies the application (e.g., Notes, Contacts, etc.) through which data in the data file is provided at the different devices, and each data node is directly or indirectly referenced by the root node. Each data node in the graph represents a data object (e.g., text, drawings, sketch, etc.) in the data file. Each node of the graph including the root node and the data nodes may be a replicated data structure, e.g., a CRDT, and the edges in the graph are references from one CRDT to another. This graph of CRDTs is a data structure that can be replicated across multiple devices (where the same data file is being concurrently updated) such that each instance or version of the data file is represented by its corresponding data model or graph. Each data node may include a unique identifier and a data value of the data object in the data file which the data node is representing. In some implementations, the data value in the data node is stored as a last-writer-wins single value container. The unique identifier of each data node represents an immutable identity of the data value or the data node, the identity which does not change across time or device. In other words, in the subject system, a same data object (e.g., text, a drawing, etc.) in a data file across multiple devices is represented in each of the replicated graphs by a data node that has the same unique identifier in all of the replicated graphs, and the identifier does not change over time regardless of how many times the data object undergoes a change or update. The unique identifiers of the data nodes are used for merging of the data nodes (e.g., CRDTs) as part of the synchronization of the data file. In one or more implementations, the data model or graph of the subject system disclosed herein does not require server architecture, provides offline support (i.e., no Internet connection is needed), and provides undo/redo support, serialization and forward/backward compatibility for data model evolution.

In one or more implementations of the subject system, as the data file is updated on multiple devices, e.g., by changing the content of the existing data objects or by adding or removing one or more data objects, the data model or graph is mutated on the devices with each mutation representing the data file update at the respective device. For example, after these updates are completed, two devices can both have a copy of the same data object with different content, and the same data model or graph can have different nodes. To synchronize the two different versions of the data file, the two mutations of the data models or graphs are merged. Such merging may include, for a same data object or data node having the same unique identifier, merging the two data values (from the two mutations of the data model or graph) to obtain a final updated, synchronized value of that data object. Further, the merging may include merging the two mutations of the data model such that a consistent data model is generated, including data nodes having the merged data values, and including latest data nodes reflecting addition or deletion of data nodes. The consistent data model represents an updated synchronized data file, which may then be rendered on the device at which the merging was completed.

In the subject system, merging of the mutations or copies of the data model or graph may relate to certain mathematical properties of consistency. For example, the merging of the data models disclosed herein may be idempotent ($A+A=A$), and commutative ($A+B=B+A$), where '+' represents the merging operation. The idempotent property may cause, when two identical versions of a data file (e.g., two local copies of the data file containing identical changes made by two different sources) are merged, the final version of the data file to be the same as either of the versions that are merged. The commutative property may cause, when two devices send their local versions of the data file to each other, and each device merges the received version of the data file (e.g., the data file containing the changes made by the remote device) with its own local version (e.g., the data file containing local changes), the final version of the data file on both devices to be consistent or identical.

However, the merging of the data model or graph disclosed herein may not provide the mathematical property of associativity, i.e., $(A+B)+C=A+(B+C)$ is not guaranteed in some cases. As such, the order of merge and communication between replicas of the data model can have an effect on the final consistent state of the data model. For example, the associative property may not be guaranteed in some cases where a data node is first removed from the data model or graph because of the deletion of the corresponding data object at one device, followed by reinserting of the data node in the data model due to re-adding of the data object at another device. Based on the order in which the deletion and re-insertion updates are received at a device (e.g., first deletion and then re-addition, or vice-versa) for merging and synchronization, the merged state of the data model may be different and thus, inconsistent at different devices.

The subject system provides (e.g., to address this issue of inconsistency due to reinsertion of data nodes) for identifying one or more data nodes (e.g., a data node that is subject to deletion and reinsertion) as a target inconsistent data node indicating uncertainty as to its final value, and sharing the identity of the target inconsistent data node with collaborating devices so that the uncertainty can be resolved with the correct and consistent data value across the multiple devices. For example, the subject system provides receiving, at the first device, a value update for the target data node such that a data value of the target data node is changed from a current data value to a new data value; receiving, from the second device, a deletion update of a target data object at the second device such that the target data node is removed from the consistent data model; and receiving, from the third device, a duplication update of the target data object such that the target data node having the current data value is to be reinserted into the consistent data model. Responsive to the duplication update, reinsertion of the target data node having the current data value into the consistent data model may be detected. Based on the detection, the target data node may be identified as an inconsistent data node indicating uncertainty as to whether the reinserted target data node should have the current data value or the new data value in the consistent data model. The uncertainty as to the final value of the target data node may be resolved based on respective globally-synchronized timestamps associated with the value update and the duplication update.

In the subject system, the merging of the data model or graph provides causal consistency, such that updates that occur in response to other updates are seen in the same common causal order. If (i) a replica performs update A followed by update B, or (ii) the replica reads from update A and later performs update B, or (iii) any transitive combination of the above, then causal consistency causes A to be visible before B. However, strict causal consistency may only be maintained across partitions of the graph that do not contain any deletions and then reinsertions of data nodes, in one or more implementations.

As used herein, an input or command (e.g., an editing input, a drawing command, etc.) for editing a document or data file is considered to be received "locally" at a device, if the input or command is an input that was provided to the device by a user directly manipulating an input user interface (e.g., the document editor user interface, the user interface of an note application, etc.) of the device that is presenting the document. The input or command is considered "locally" received at the device (e.g., the first device of the multiple collaborating devices) regardless of whether the user is physically proximate to the device or accessing the device via a network (e.g., via a Virtual Private Network (VPN) session or a dump terminal). When the input or command is later propagated to other collaborating devices, e.g., during a synchronization event and/or as part of a graph or command sequence, the input or command is considered to be a "remotely" received input or command for the other collaborating devices.

FIG. 1 illustrates an example electronic device 100 that may implement a system for reducing metadata for replicated data structures in accordance with one or more implementations. Not all of the depicted components may be used in all implementations, however, and one or more implementations may include additional or different components than those shown in FIG. 1. Variations in the arrangement and type of the components may be made without departing from the spirit or scope of the claims as set forth herein. Additional components, different components, or fewer components may be provided.

The electronic device 100 may be, for example, a portable computing device such as a laptop computer, a smartphone, a smart speaker, a peripheral device (e.g., a digital camera, head-phones), a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios.

The electronic device 100 may include a processor 102, a memory 104, and a communication interface 106. The processor 102 may include suitable logic, circuitry, and/or code that enable processing data and/or controlling operations of the electronic device 100. In this regard, the processor 102 may be enabled to provide control signals to various other components of the electronic device 100. The processor 102 may also control transfers of data between various portions of the electronic device 100. Additionally, the processor 102 may enable implementation of an operating system or otherwise execute code to manage operations of the electronic device 100.

The memory 104 may include suitable logic, circuitry, and/or code that enable storage of various types of information such as received data, generated data, code, and/or configuration information. The memory 104 may include, for example, random access memory (RAM), read-only memory (ROM), flash, and/or magnetic storage.

In one or more implementations, the memory 104 may store data or content (e.g., list(s) or memo(s) such as a grocery list, a home improvement list, a reminder note which is not in list form, a contacts list, an events list) that are generated by one or more applications (e.g., a notetaking application, a personal information manager application, an address book application and/or another application for managing data). The memory 104 may further store data structures, e.g., the data models or graphs disclosed herein including CRDTs for individual data objects. The data models or graphs stored in the memory 104 may include the data models or graphs generated or updated locally at the device 100 as well as the data models or graphs (or their replicas) received from other devices. As part of the data models, the memory 104 may store unique identifiers and the data values of the data nodes.

The communication interface 106 may include suitable logic, circuitry, and/or code that enables wired or wireless communication, such as between other electronic devices and/or a server over a network (not shown). The communication interface 106 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 102, the memory 104, the communication interface 106, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Attention is now directed towards illustrative examples of user interfaces ("UI") and associated processes that may be implemented on multiple electronic devices, such as the electronic device 100 with a display.

FIGS. 2-6 illustrate exemplary user interfaces for collaborative or concurrent editing of a data file (e.g., a note in a notetaking application), along with corresponding changes made to data structures for generating local and synchronized data files with content provided on the user interfaces during the collaborative editing, in accordance with some implementations. The user interfaces and changes made to the data structures in these figures are used to illustrate the processes described used in the subject system, e.g., the processes in FIGS. 7 and 8.

Figure 2:
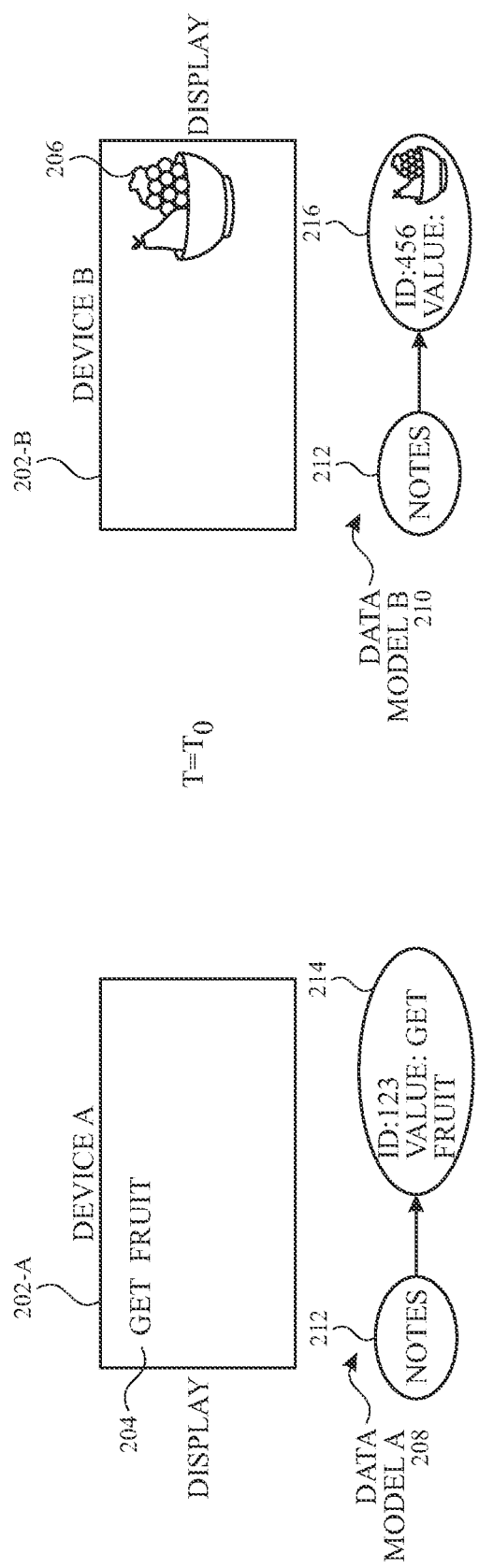
FIG. 2 illustrates exemplary user interfaces for providing collaborative or concurrent data updates in a common data file and exemplary data models or graphs representing the exemplary data updates in accordance with one or more implementations.

FIG. 2 illustrates two devices (e.g., Device A and Device B) both having similar implementation as the electronic device 100 and both of which provide for editing a single data file 202 (e.g., a note document). Although only two devices are used in this example, the principles described in this example are applicable to scenarios involving more than two devices. As shown in FIG. 2, during a time period $T=T_0$, a user of Device A has entered some text 204 (e.g., a character string "Get fruit") in a first local copy of the note document (e.g., replica or data file 202-A), and a user of Device B has added a picture or image 206 (e.g., of fruits in a bowl) in a second local copy of the note document (e.g., replica or data file 202-B). Both text 204 and image 206 are considered unique data objects that make up the data file 202-A and 202-B, respectively. The locally entered content appears on the display of the respective devices at which the locally entered content was first received. Before a first synchronization event occurs, each device displays the locally entered content (text 204 and image 206), and updates a local data model or graph 208 and 210 representing the current state of the content that has been entered in the local copy of the data file 202. The respective local data models or graphs 208 and 210 at Devices A and B, respectively, are shown in FIG. 2. (The terms 'data model' and 'graph' are used interchangeably in this disclosure.)

In some embodiments, concurrent editing on the same data file 202 occurs when two or more collaborating devices (e.g., Device A and Device B) have started with the same version of a data file 202, and have made independent changes to that same version of the data file 202 before a synchronization event to merge the changes from the different devices into the same data file. The synchronization operations for the same set of changes do not have to start on all devices at the same time, but the synchronization event is only completed when all the devices have received and merged all changes received locally and all changes received from all other devices. In one or more implementations, a device optionally indirectly receives the changes made at another device from a central server, directly from the other device, or indirectly from another device that is in communication with the other device at which the changes were first made. In one or more implementations, the changes are optionally received in the form of the whole local data file, or in the form of a representation (e.g., a data model or graph) of the local data file from which the data file can be reconstructed, or in the form of incremental differences or representations of the incremental differences (e.g., partial graphs with modified nodes and edges) between the current and the most recent versions of the local data file.

As noted above, each of the graphs 208, 210 includes a root node 212 and one or more children data nodes 214, 216. The root node 212 may be an observed-remove set and identifies the application (e.g., a notetaking application) used for providing content to the data file 202. Each of data nodes 214, 216 is referenced by the root node 212. Each data node in the graph represents a corresponding data object (e.g., text 204, image 206, etc.) in the data file 202. Each of the nodes 212, 214, 216 may represent a replicated data structure, e.g., a CRDT, and the edges in the graphs are references from one CRDT to another, e.g., from CRDT node 212 to CRDT node 214 and to CRDT node 216.

Each of the data nodes 214, 216 may include a unique identifier and a data value of the respective data object 204, 206 in the data file 202. In some implementations, the data value in the data node is stored as a last-writer-wins single value container and may be the content of the data object. For example, as shown in FIG. 2, the data node 214 includes the identifier '123' uniquely associated with the text 204, and the value 'Get fruit' representing the content of the text 204. Similarly, the data node 216 includes the identifier '456' uniquely associated with the image 206, and the value representing the content (e.g., the fruit bowl image) of the image 206. The unique identifiers of each data node 214, 216 represents an immutable identity of the corresponding data object 204, 206 or the data node 214, 216. This identity does not change across time or device. The unique identifiers of the data nodes are used for merging of the data nodes (e.g., CRDTs) as part of the synchronization of the data file, as discussed below with respect to FIG. 3, for example.

Figure 3:
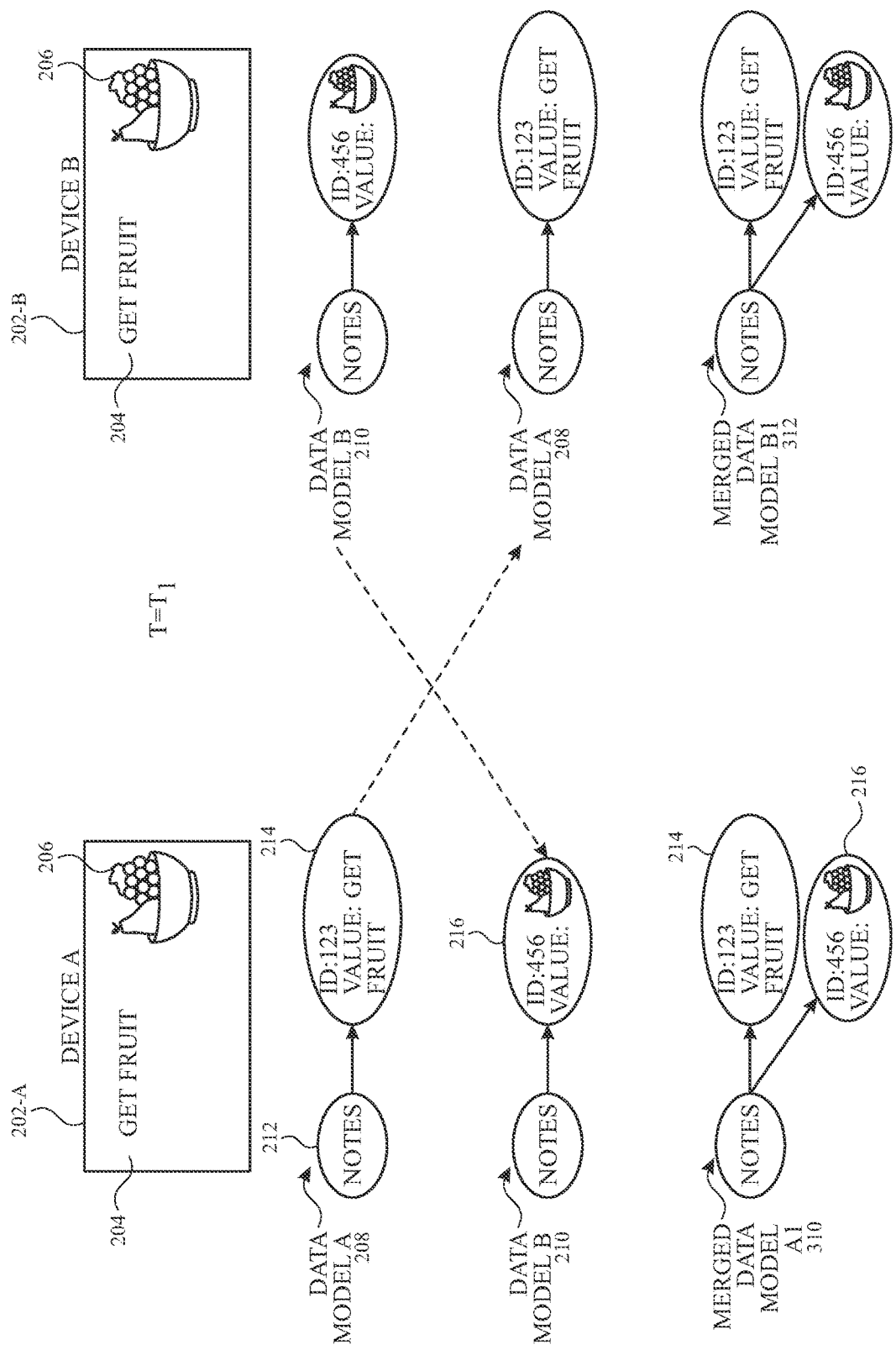
FIG. 3 illustrates exemplary synchronization of data updates shown in FIG. 2 and merging of data models or graphs in accordance with one or more implementations.

In some implementations, the data models or graphs 208, 210 are stored in the memory 104 of the respective electronic devices 100 (e.g., Device A and Device B) and are exchanged between devices during a synchronization event for merging to obtain a consistent data model reflective of all the changes made at both the devices. As shown in FIG. 3, at time $T_1$, a first synchronization event occurs. Each of the two Devices A, B obtains the local graph (or only a portion of the local graph with modified nodes and edges that represent incremental differences) from the other device, and merges the obtained local graph (or the portion of the local graph) to its own local graph (graph 310 at Device A and graph 312 at Device B).

As part of the merging of the graphs, e.g., at Device A, the subject system first identifies the data nodes in the local graph 208 and in the received graph 210 which have the same identifier values (thus representing two versions of the same data object in the graphs 208, 210). In some implementations in which the data nodes are implemented as CRDTs, for each of the identified data nodes, the subject system merges the data node based on operation used for merging mutations of a CRDT using a technique known in the art. In the merging scenario illustrated in FIG. 3, because the two data nodes 214, 216 do not share the same identifier (as they represent different data objects), no merging of the data nodes takes place. However, as a further part of the merging of the graphs, e.g., at Device A, the subject system then merges the graphs 208, 210 such that the merged graph 310 would represent all of the (merged) data nodes of the graph 208 as well as any added or removed data nodes in the graph 210 relative to the graph 208. On merging, the resulting graph is the union of all nodes and edges from the local graphs from all replicas, although some empty or redundant edges may be removed. Accordingly, the merged graph 310 includes the data node 214 as well as (relative to Device A) newly added data node 216. Similar to the merging of the graphs process at Device A, the graph merging would also occur at Device B resulting in the graph 312, which is consistent with the graph 310 at Device A. The graphs 310, 312 (and any other graphs described in this disclosure) may be stored in the memory 104 of the respective electronic devices 100, and/or may be stored in a storage device (e.g., a cloud storage device) separate from Devices A, B.

After the first synchronization event, both devices display a merged data file with both the text 204 and the image 206 based on the merged graph 310, 312. The graphs 310, 312 at both devices have been synchronized and represent the current state of the content of the data file 202 that has been edited at both Devices A, B. In one or more implementations, during a synchronization event, the entireties of the local graphs are sent between the devices as the basis for generating the merged graph at each device. This can be advantageous, for example, when the network connectivity is unreliable, and providing full local graphs reduces the likelihood of inconsistencies and errors. In one or more implementations, only individual changes made to the local graphs are sent between the devices. By sending only the changes to the local graphs (e.g., the baseline local graph is same as the merged graph obtained from the last synchronization event), the synchronization can happen faster and more frequently which is particularly suitable for real-time collaboration scenarios. In one or more implementations, fragments of the graph are archived and merged into other versions of the graph.

Figure 4:
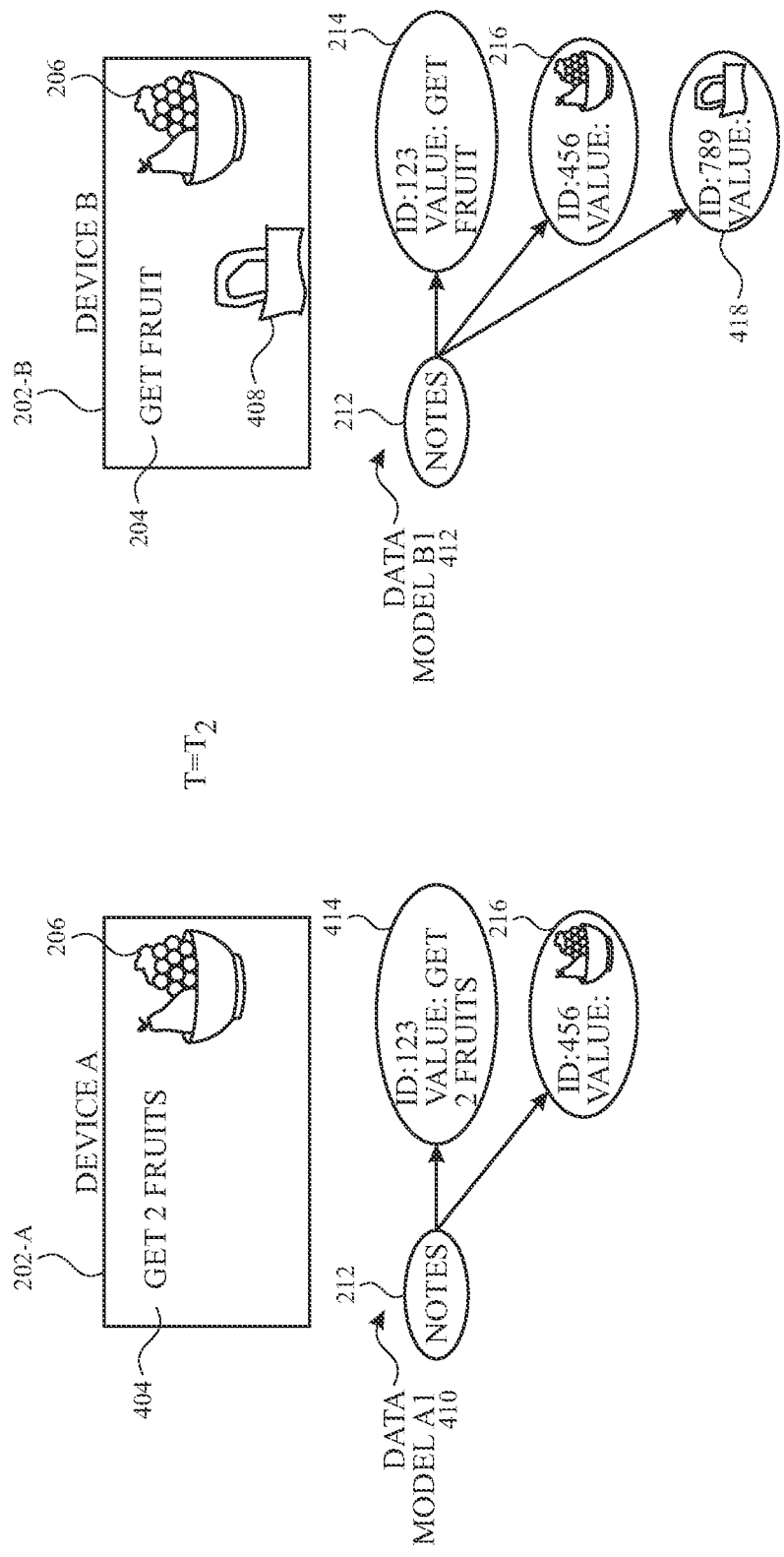
FIG. 4 illustrates exemplary user interfaces for providing collaborative or concurrent data updates in a common data file following exemplary data synchronization shown in FIG. 3 and exemplary data models or graphs representing the exemplary data updates in accordance with one or more implementations.

FIG. 4 illustrates changes made to the data file 202 at $T=T_2$ after the first synchronization at Devices A, B. As shown in FIG. 4, a user at Device A changes the text in the data file 202-A such that the text 204 'Get fruit' is changed to the text 404 'Get 2 fruits'. So the data file 202-A is displayed with modified text 404 and the image 206 added after the first synchronization. The local graph 310 at Device A is updated to include the local changes made to the text, resulting in the updated graph 410. Specifically, the value of the data node 214 is updated to 'Get 2 fruits' in accordance with the updated text 404 to the updated data node 414 in the graph 410. At Device B, a user inserts a sketch or drawing of a shopping bag sketch 408 in the data file 202-B, e.g., by using a feature of the notetaking application in which a user can generate a sketch by directly drawing using a finger or a stylus on the touchscreen of the device. As such, Device B displays text 204 and image 206 (from the previous synchronization process) and the newly added data object, the bag sketch 408. Correspondingly, the local graph 312 at Device B is updated to include the local changes, i.e., the addition of the bag sketch 408, made to the data file 202-B. For example, the updated graph 412 includes the previous data nodes 214, 216 and adds a new data node 418 having its identifier '789' and the value representing the sketch 408. As noted above, the identifiers of unique data nodes in a graph are unique with respect to each other and are unique relative to the identifiers of unique data nodes in other graphs or other mutations or copies of the graph.

Figure 5:
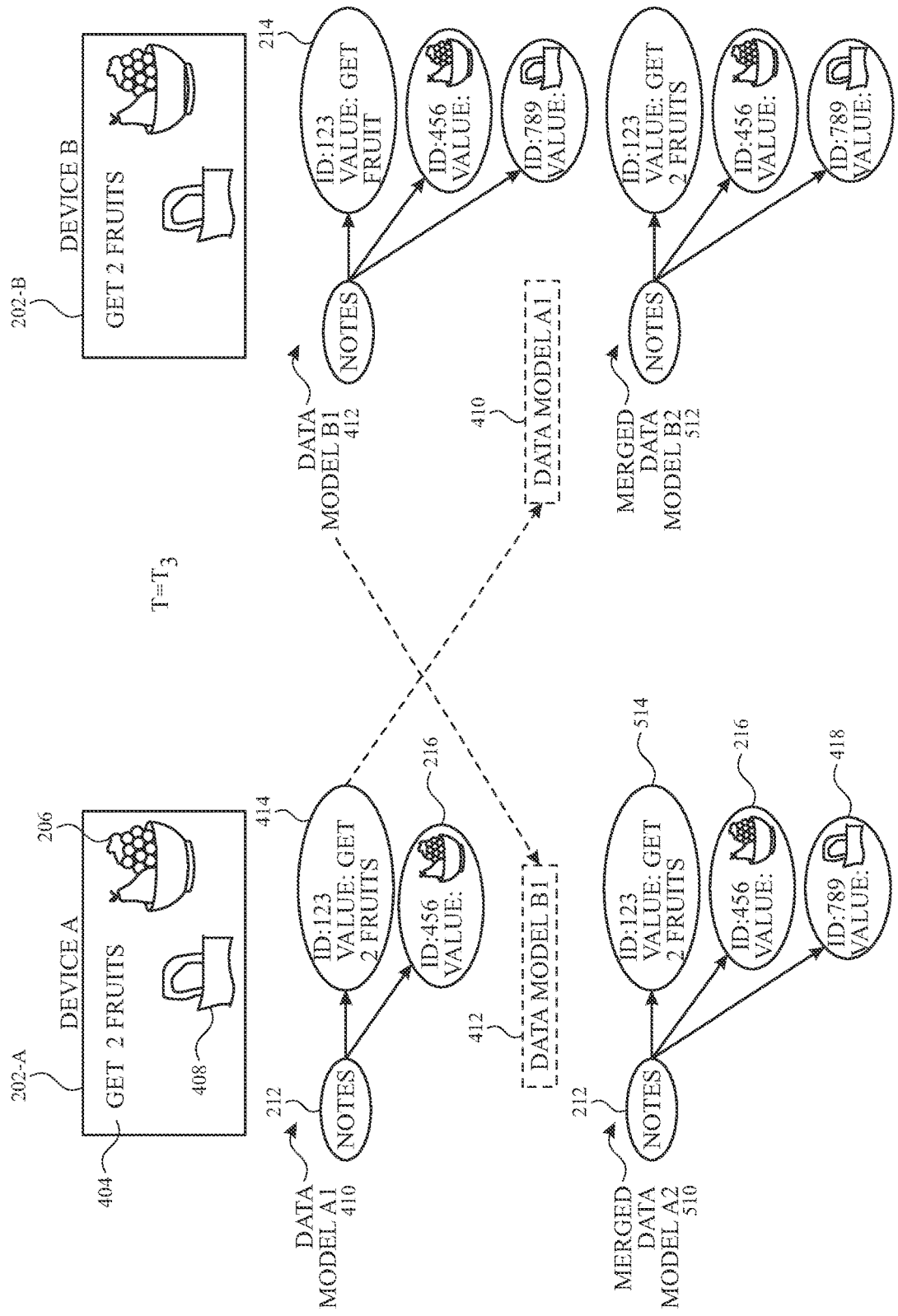
FIG. 5 illustrates exemplary synchronization of data updates shown in FIG. 4 and merging of data models or graphs in accordance with one or more implementations.

FIG. 5 shows the second synchronization of the data files 202-A and 202-B and merging of their data models after the changes made at $T=T_2$ (as shown in FIG. 4) to obtain a consistent data model reflective of all the changes made at both the devices. As shown in FIG. 5, at time $T_3$, a second synchronization event occurs. Each of the two Devices A, B obtains the local graph from the other device, and merges the obtained local graph to its own local graph (graph 410 at Device A and graph 412 at Device B). As part of the merging of the graphs, e.g., at Device A, the subject system first identifies and merges the data nodes in the local graph 410 and in the received graph 412 which have the same identifier values (thus representing two versions of the same data object in the graphs 410, 412). In some implementations in which the data nodes are implemented as CRDTs, for each of the identified data nodes, the subject system merges the data node based on a merging process for mutations of a CRDT. In the merging scenario illustrated in FIG. 5, the data node 414 (in the graph 410) and the data node 214 share the same identifier '123' (as they represent the same text data object in the data file) and thus are merged using the CRDT merging process. This merging of the data nodes result in the merged data node having its value updated according to predetermined criteria, which may include merging preferences based on device identifiers (e.g., Universal Unique Identifiers (UUIDs)) of the devices associated with the data nodes being merged and/or based on a globally-synchronized timestamps associated with the timing of the updates. For example, by merging the data nodes 414 and 214, the value of the merged node 514 is based on the timestamps associated with the values of data nodes 414 and 214 and/or timestamps associated with the data objects 404 and 204. In some instances, the value of the merged node 514 is the data node value associated with a later timestamp. As such, in this example, the value of the data node 514 is the value of the data node 414 as it is associated with $T=T_2$, which is later than the time $T_0$ associated with the data node 214. In one or more implementations, in addition to or instead of the timestamp criterion, another factor, e.g., the identity (e.g., UUID) and/or the type of the device at which the update was made, may be considered for merging of the data nodes.

As a further part of the merging of the graphs, e.g., at Device A, the subject system merges the graphs 410, 412 such that the merged graph 510 would represent all of the (merged) data nodes of the graph 410 as well as any newly added or removed data nodes in the graph 412 relative to the graph 410. On merging, the resulting graph is the union of all nodes and edges from the local graphs from all replicas, although some empty or redundant edges may be removed. Accordingly, the merged graph 510 includes the merged data node 514 (obtained by merging data nodes 414 and 214), the data node 216 (unchanged from the graph 410), and (relative to Device A) newly added data node 418. Similar to the merging of the graphs process at Device A, the graph merging would also occur at Device B resulting in the graph 512, which is consistent with the graph 510 at Device A. The graphs 510, 512 may be stored in the memory 104 of the respective electronic devices 100, and/or may be stored in a storage device (e.g., a cloud storage device) separate from Devices A, B. After the second synchronization event, both devices display or render a merged data file with the text 404, the image 206 and the sketch 408 based on the merged graphs 510, 512. The graphs 510, 512 at both devices have been synchronized and represent the current state of the content of the data file 202 that has been edited at both Devices A, B.

As noted above, the merging of the data models or graphs disclosed herein may not provide the mathematical property of associativity, e.g., $(A+B)+C=A+(B+C)$ is not guaranteed in some examples. As such, the order of merge and communication between replicas of the data model can have an effect on the final consistent state of the data model. The associative property may not be guaranteed, for example, in some cases where a data node is first removed from the data model or graph because of the deletion of the corresponding data object at one device, followed by reinserting of the data node in the data model due to re-adding of the data object at another device. Based on the order in which the deletion and re-insertion updates are received at a device (e.g., first deletion and then re-addition, or vice-versa) for merging and synchronization, the merged state of the data model may be different and thus, inconsistent at different devices.

Figure 6:
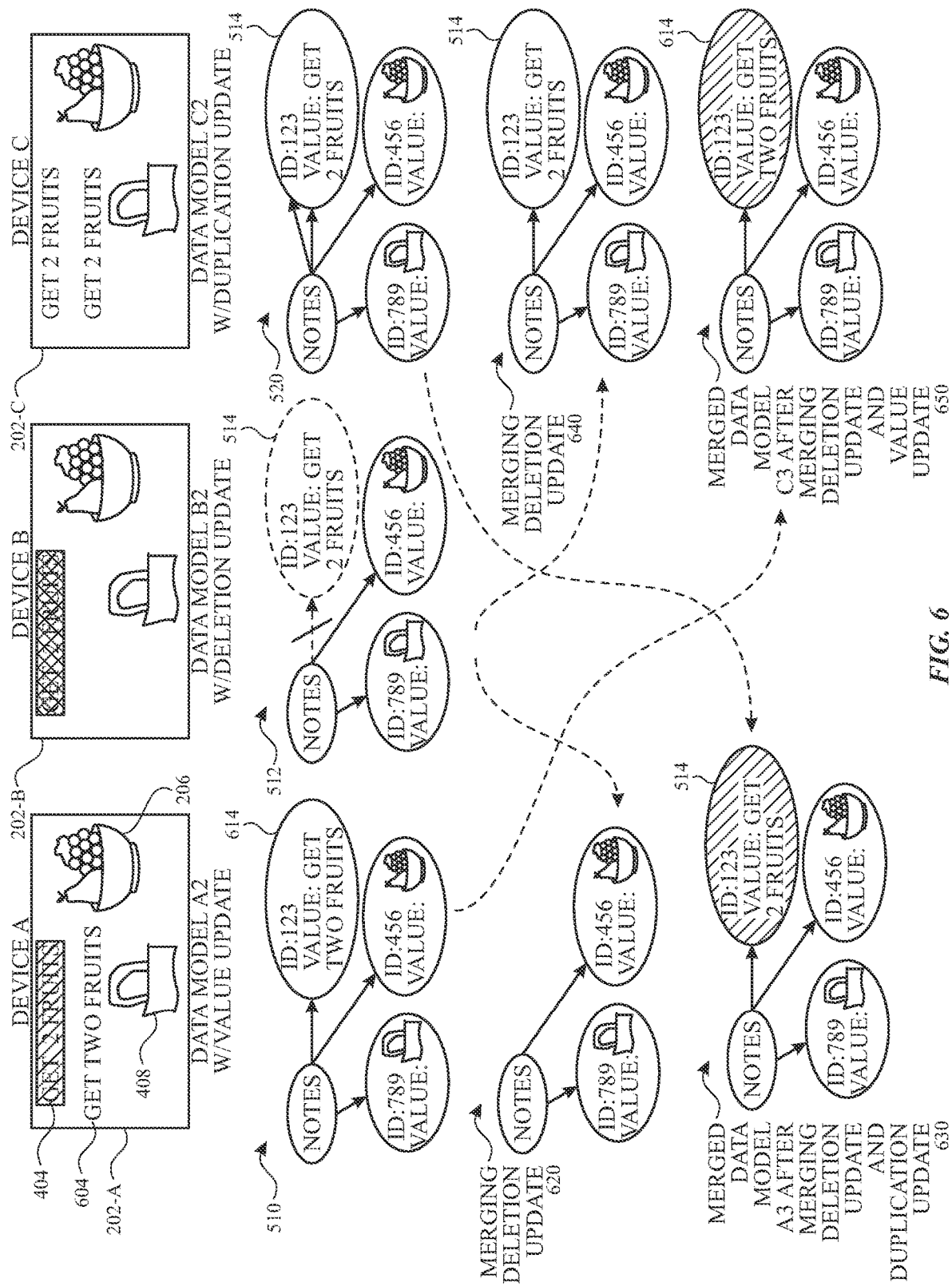
FIG. 6 illustrates exemplary user interfaces for providing collaborative or concurrent data updates in a common data file following exemplary data synchronization shown in FIG. 5 and exemplary merging of data models or graphs including deletion and reinsertion of data nodes in accordance with one or more implementations.

FIG. 6 illustrates an example of merging of the graphs resulting in reinsertion of a deleted data node in accordance with one or more implementations. In the example of FIG. 6, the data file 202 (e.g., a note document in a notetaking application) at Device A, Device B, and Device C start in the same consistent state, having the text 404, the image 206, and the sketch 408, and their respective graphs 510, 512, 520 having the same data nodes 514, 216, 418. In this example, a user at Device A provides a value update changing the content of the text 404 from 'Get 2 fruits' to 'Get two fruits' labeled 604. A user at Device B provides a deletion update, deleting the text 404 from the data file 202-B. And, a user at Device C provides a duplication update, creating another instance of the same text 404 in the data file 202-C. Reflecting these three updates, the local graphs 510, 512, 520 are also updated at Devices A, B, C, respectively. For example, the graph 510 at Device A is updated by changing the value of the data node 514 to 'Get two fruits' shown in the data node 614, which represents the latest content of the text data object 604. The graph 512 at Device B is updated to remove the data node 514 from the graph 512 (or mark or flag the data node 514 as being deleted). And, the graph 520 at Device C is updated to add a new edge from the root node 212 to the data node 514 representing the duplication or another instance of the data node 514 in the graph 520.

With respect to merging these updates, in the example shown in FIG. 6, Device A first receives the updated graph 512 from Device B (modified per the deletion update) and merges the updated graph 510 (including the value update) with the updated graph 512. This merging of the graphs 510 and 512 results in the removal of the data node 614 from the merged graph 620 as the subject system at Device A 'sees' the removal of the data node 514 corresponding to the deleted text 404 at Device B. Further, Device A receives the updated graph 520 from Device C (modified per the duplication update) and merges the graph 620 (including the merged value update and deletion update) with the updated graph 520. This further merging results in the merged graph 630, in which the previous unchanged data node 514 having the previous unchanged text value 'Get 2 fruits' is reinserted in the merged graph. Accordingly, after merging of all three updates at Device A, based on the graph 630, the final synchronized state of the text data object in the data file 202-A would revert to its unchanged content ('Get 2 fruits').

With respect to merging these updates at Device C, in the example shown in FIG. 6, Device C first receives the updated graph 512 from Device B (modified per the deletion update) and merges the updated graph 520 (including the duplication update) with the updated graph 512. This merging of the graphs 512 and 520 results in the removal of the duplicated edge to the data node 514 in the merged graph 640 as the subject system at Device C 'sees' the removal of one of the two duplicated instances of the data node 514. Further, Device C receives the updated graph 510 from Device A (modified per the value update) and merges the graph 640 (including the merged duplication update and deletion update) with the updated graph 510. This further merging provides the merged graph 650, in which, based on the same identifier '123', the CRDTs of the data nodes 514 and 614 are merged, which results in modifying the value of the data node from 'Get 2 fruits' to 'Get two fruits'. As noted above, the merging of the data nodes (having the same identifier) may be based on timestamps associated with the data nodes, such that a data value having a later timestamp prevails or preferred over a data value with an earlier timestamp. Accordingly, after merging of all three updates at Device C, based on the graph 650, the final synchronized state of the text data object in the data file 202-C would display 'Get two fruits'. As such, although both Device A and Device C see and merge the same three updates, the different orders in which the updates are merged result in different, inconsistent final state of content of the data files at Device A and Device C.

To address this issue of inconsistency due to reinsertion of deleted data nodes, the subject system provides for identifying one or more data nodes, such as a data node that is subject to deletion and reinsertion as a target inconsistent data node indicating uncertainty as to its final value, and sharing the identity of the target data node with collaborating devices so that the uncertainty can be resolved with the correct and consistent data value across the devices. In some embodiments, Device A maintains a running log or record (e.g., in the form of a vector clock) of the all the updates to the data file 202-A, whether made locally at Device A or received from other devices, e.g., Device B and Device C. For example, each update may be associated with an unique identifier in the log, the unique identifier may be a combination of a device ID (e.g., UUID) of the source device at which the update was first made, and a current value of a local counter (based, e.g., on a local clock maintained at each source device) indicating the order in which the update was made at the source device. Based on this log, if the subject system identifies that a data node is first deleted or removed and is later being reinserted in the graph (as shown in FIG. 6), the subject system identifies or flags that data node as a potential inconsistent data node, which may result in inconsistent merged data graphs at different devices. The potential inconsistency may relate to uncertainty as to whether the reinserted data node should have a previous unchanged data value or a new changed data value in the eventual merged graph.

In the example shown in FIG. 6, once the subject system at Device A identifies an inconsistent data node (e.g., the data node 614), Device A sends the identification information to Device C, e.g., before or at the same time when the graph 510 is sent to Device C for merging with the graph 640. Based on the received identification of the data node 614 as being an inconsistent data node, Device C may communicate with Device A to resolve the uncertainty around the final data value for the text data node. In one or more implementations, the subject system resolves such uncertainty as to the eventual data value based on respective timestamps associated with the value update and the duplication update, the timestamps being globally-synchronized across the various devices. For example, whichever of these updates had a later timestamp may be used to dictate the final data value for the data node, and thus, the final synchronized content for the text data object in the data files 202-A and 202-C.

Figure 7:
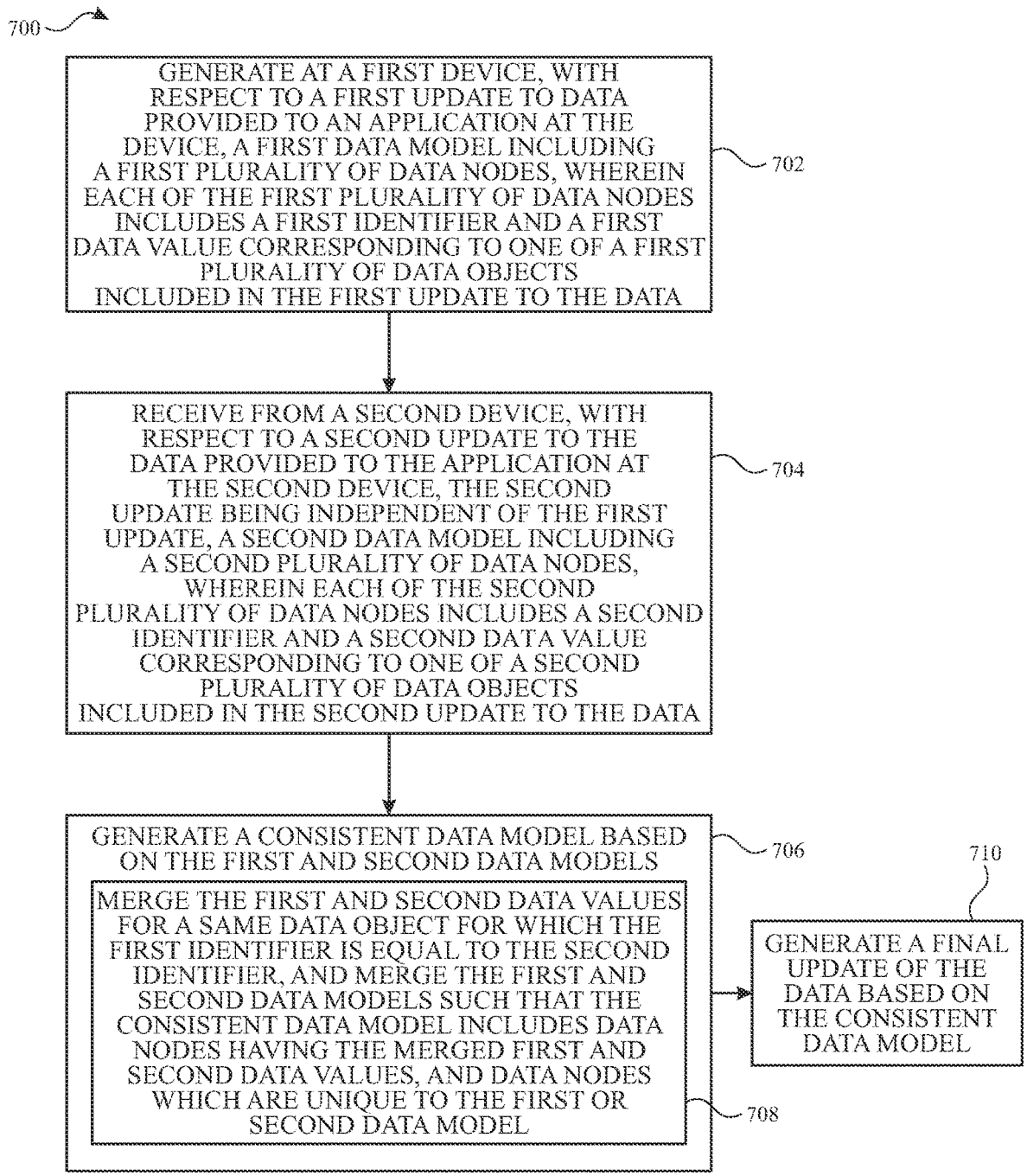
FIG. 7 illustrates a flow diagram of an example process for obtaining a consistent state of data provided to an application based on updates made to the data on different devices in accordance with one or more implementations.

FIG. 7 illustrates a flow diagram of an example process for obtaining a consistent state of data provided to an application based on updates made to the data on different devices in accordance with one or more implementations. For illustrative purposes, the process 700 is primarily described herein with reference to Device A of FIGS. 2-6 (where Device A may be implemented as the electronic device 100 of FIG. 1). However, the process 700 is not limited to Device A, and one or more blocks (or operations) of the process 700 may be performed by one or more other components of Device A and/or other suitable devices. Further for illustrative purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

In the example of FIG. 7, Device A generates, with respect to a first update to the data at the first device, a first data model including a first plurality of data nodes (702). Each of the first plurality of data nodes includes a first identifier and a first data value corresponding to one of a first plurality of data objects included in the first update to the data (such that, e.g., the first plurality of data objects constitutes the first update to the data).

In the example of FIG. 7, Device A receives from a second device (e.g., Device B or Device C), with respect to a second update to the data at the second device, the second update being independent of the first update, a second data model including a second plurality of data nodes (704). Each of the second plurality of data nodes includes a second identifier and a second data value corresponding to one of a second plurality of data objects included in the second update to the data (such that, e.g., the second plurality of data objects constitutes the second update to the data).

The first and second data models may also include a root node, the root node identifying the application, and each of the respective plurality of data nodes is directly or indirectly referenced by the root node. For example, each data node of the first and second pluralities of data nodes may be implemented as a conflict-free replicated data type (CRDT). Each data object may correspond to electronic content generated using the application, the electronic content including at least one of a text, a drawing or sketch, a media file, a list, and an image. In one or more implementations, the first identifiers are unique with respect to each other and the second identifiers are unique with respect to each other. Further, the first or second identifier corresponding to a data object that is included in both the first and second pluralities of data objects is unique with respect to the rest of the first and second identifiers.

In the example of FIG. 7, Device A generates a consistent data model based on the first and second data models (706). In the example of FIG. 7, to generate a consistent data model, Device A merges the first and second data values for a same data object for which the first identifier is equal to the second identifier, and merges the first and second data models such that the consistent data model includes data nodes having the merged first and second data values, and data nodes which are unique to the first or second data model (708). The merging of the first and second data values may be based on respective globally-synchronized timestamps associated with the first and second data values. In the example of FIG. 7, Device A generates a final update of the data based on the consistent data model (710), and renders on a display of Device A, the application including the final update of the data. Device A may also send the consistent data model to a storage service (e.g., a cloud storage service) outside of and separate from Device A.

Figure 8:
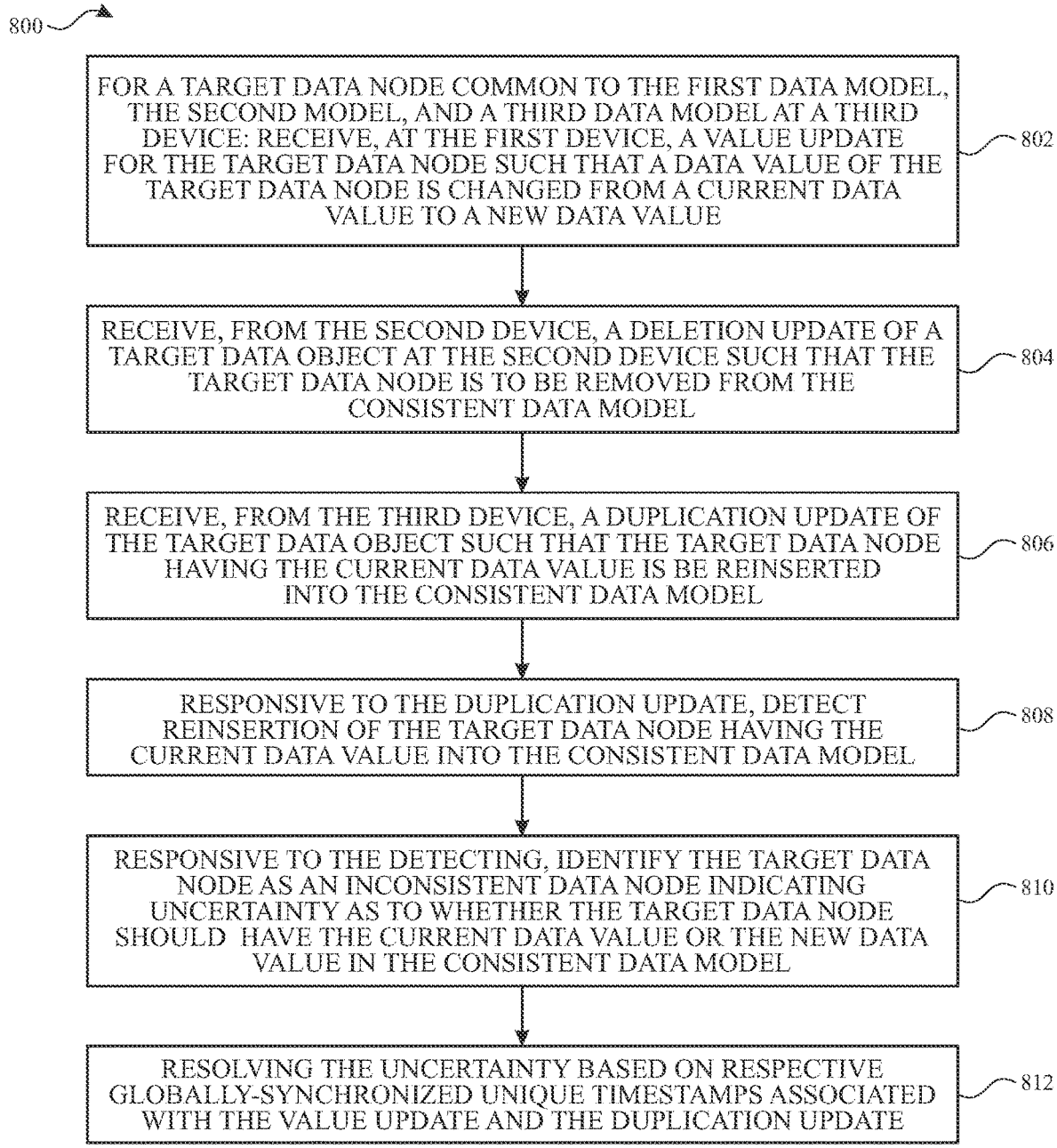
FIG. 8 illustrates a flow diagram of an example process for identifying a target data node as an inconsistent data node in accordance with one or more implementations.

FIG. 8 illustrates a flow diagram of an example process for identifying a target data node as an inconsistent data node in accordance with one or more implementations. For illustrative purposes, the process 800 is primarily described herein with reference to Device A of FIG. 6 (where Device A may be implemented as the electronic device 100 of FIG. 1) and the process 700 of FIG. 7. However, the process 800 is not limited to Device A and the process 700, and one or more blocks (or operations) of the process 800 may be performed by one or more other components of Device A and/or other suitable devices. Further for illustrative purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

In the example of FIG. 8, for a target data node common to the first data model, the second model, and a third data model at a third device, Device A receives a value update for the target data node such that a data value of the target data node is changed from a current data value to a new data value (802). In the example of FIG. 8, Device A receives, from the second device (e.g., Device B), a deletion update of a target data object at the second device such that the target data node is removed from the consistent data model (804). In the example of FIG. 8, Device A receives, from the third device (e.g., Device C), a duplication update of the target data object such that the target data node having the current data value is to be reinserted into the consistent data model (806).

In the example of FIG. 8, responsive to the duplication update, Device A detects reinsertion of the target data node having the current data value into the consistent data model (808). In the example of FIG. 8, responsive to the detecting at 808, Device A identifies the target data node as an inconsistent data node indicating uncertainty as to whether the reinserted target data node should have the current data value or the new data value in the consistent data model (810). In the example of FIG. 8, Device A resolves the uncertainty based on respective globally-synchronized timestamps associated with the value update and the duplication update (812). For example, Device A, Device B, and Device C all may be associated with a synchronized clock, such that the timestamps recorded for each update at each of these devices are consistent in time across all devices. Accordingly, to resolve the uncertainty, Device A may utilize (e.g., compare) the timestamp (recorded at Device A) associated with the value update and the timestamp (recorded at Device C) associated with the duplication update.

The present disclosure recognizes that the use of personal information data, in the present technology, can be used to the benefit of users. For example, the personal information data can be used for providing and merging concurrent updates to data in a same data file across different devices or different instances of a same application.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading or opening an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 9:
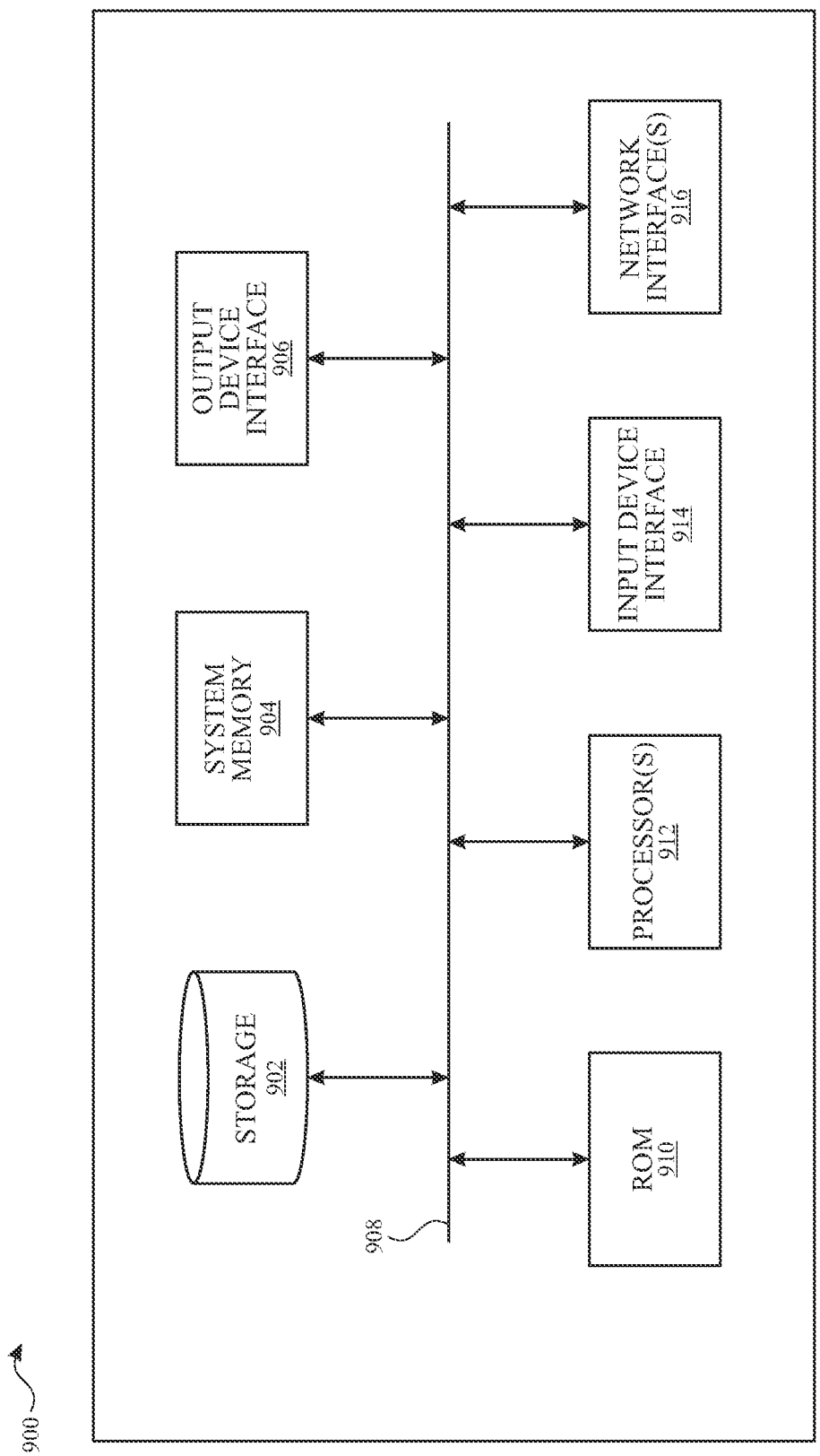
FIG. 9 illustrates an electronic system with which one or more implementations of the subject technology may be implemented.

FIG. 9 illustrates an electronic system 900 with which one or more implementations of the subject technology may be implemented. The electronic system 900 can be, and/or can be a part of, the electronic device 100 shown in FIG. 1. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more network nodes, such as the electronic device 100 shown in FIG. 1, through the one or more network interface(s) 916. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

In accordance with aspects of the disclosure, a method is provided that includes generating at a first device, with respect to a first update to data provided to an application at the first device, a first data model including a first plurality of data nodes, wherein each of the first plurality of data nodes includes a first identifier and a first data value corresponding to one of a first plurality of data objects included in the first update to the data; receiving from a second device, with respect to a second update to the data provided to the application at the second device, the second update being independent of the first update, a second data model including a second plurality of data nodes, wherein each of the second plurality of data nodes includes a second identifier and a second data value corresponding to one of a second plurality of data objects included in the second update to the data; generating a consistent data model based on the first and second data models by: merging the first and second data values for a same data object for which the first identifier is equal to the second identifier, and merging the first and second data models such that the consistent data model includes data nodes having the merged first and second data values, and data nodes which are unique to the first or second data model; and generating a final update of the data based on the consistent data model.

In accordance with aspects of the disclosure, a device is provided that includes at least one processor; and a memory including instructions for obtaining a consistent state of data provided to an application based on updates to the data made on different devices that, when executed by the at least one processor, cause the at least one processor to: generate at the device, with respect to a first update to the data at the device, a first data model including a first plurality of data nodes, wherein each of the first plurality of data nodes includes a first identifier and a first data value corresponding to one of a first plurality of data objects included the first update to the data; receive from a second device, with respect to a second update to the data at the second device, the second update being independent of the first update, a second data model including a second plurality of data nodes, wherein each of the second plurality of data nodes includes a second identifier and a second data value corresponding to one of a second plurality of data objects included in the second update to the data; generate a consistent data model based on the first and second data models by: merging the first and second data values for a same data object for which the first identifier is equal to the second identifier, and merging the first and second data models such that the consistent data model includes data nodes having the merged first and second data values, and data nodes which are unique to the first or second data model; and generate a final update of the data based on the consistent data model.

In accordance with aspects of the disclosure, a computer program product is provided that includes code, stored in a non-transitory computer-readable storage medium, the code including: code to generate at a first device, with respect to a first update to data provided to an application at the first device, a first data model including a first plurality of data nodes, wherein each of the first plurality of data nodes includes a first identifier and a first data value corresponding to one of a first plurality of data objects included in the first update to the data; code to receive from a second device, with respect to a second update to the data provided to the application at the second device, the second update being independent of the first update, a second data model including a second plurality of data nodes, wherein each of the second plurality of data nodes includes a second identifier and a second data value corresponding to one of a second plurality of data objects included in the second update to the data; code to generate a consistent data model based on the first and second data models by: merging the first and second data values for a same data object for which the first identifier is equal to the second identifier, and merging the first and second data models such that the consistent data model includes data nodes having the merged first and second data values, and data nodes which are unique to the first or second data model; and code to generate a final update of the data based on the consistent data model.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
    generating at a first device, with respect to a first update to data provided to an application at the first device, a first data model including a first plurality of data nodes, wherein each of the first plurality of data nodes includes a first identifier and a first data value corresponding to one of a first plurality of data objects included in the first update to the data, wherein each data node of the first plurality of data nodes is implemented as a respective conflict-free replicated data type (CRDT) and at least some of the first plurality of data nodes references another of the first plurality of data nodes;
    receiving from a second device, with respect to a second update to the data provided to the application at the second device, the second update being independent of the first update, a second data model including a second plurality of data nodes, wherein each of the second plurality of data nodes includes a second identifier and a second data value corresponding to one of a second plurality of data objects included in the second update to the data, wherein each data node of the second plurality of data nodes is implemented as a respective another CRDT and at least some of the second plurality of data nodes references another of the second plurality of data nodes;
    generating a consistent data model based on the first and second data models by:
        merging the first and second data values for a same data object for which the first identifier is equal to the second identifier, and
        merging the first and second data models such that the consistent data model includes data nodes having the merged first and second data values, and data nodes which are unique to the first or second data model; and
    generating a final update of the data based on the consistent data model.

2. The method of claim 1, further comprising:
    receiving, at the first device, a value update for a target data node such that a data value of the target data node is changed from a current data value to a new data value;
    receiving, a deletion update of a target data object such that the target data node is removed from the consistent data model;

receiving, a duplication update of the target data object such that the target data node having the current data value is to be reinserted into the consistent data model;

responsive to the duplication update, detecting reinsertion of the target data node having the current data value into the consistent data model; and responsive to the detecting, identifying the target data node as an inconsistent data node indicating uncertainty as to whether the reinserted target data node should have the current data value or the new data value in the consistent data model.

3. The method of claim 2, further comprising resolving the uncertainty based on respective globally-synchronized timestamps associated with the value update and the duplication update.

4. The method of claim 1, further comprising rendering on a display of the first device or the second device, the application including the final update of the data.

5. The method of claim 1, wherein the first and second data models each include a root node, the root node identifying the application, and each of the respective plurality of data nodes is directly or indirectly referenced by the root node.

6. The method of claim 1, wherein the merging of the first and second data values is based on respective globally-synchronized timestamps associated with the first and second data values.

7. The method of claim 1, wherein each of the first and second data models comprises a respective graph in which the first and second pluralities of data nodes are interconnected by respective first and second pluralities of edges.

8. The method of claim 1, further comprising sending the consistent data model to a storage service.

9. The method of claim 1, wherein the first identifiers are unique with respect to each other and the second identifiers are unique with respect to each other, and the first or second identifier corresponding to a data object that is included in both the first and second pluralities of data objects is unique with respect to the rest of the first and second identifiers.

10. The method of claim 1, wherein each data object corresponds to electronic content generated using the application, the electronic content including at least one of a text, a drawing, a media file, a list, and an image.

11. A device, comprising:

at least one processor; and a memory including instructions for obtaining a consistent state of data provided to an application based on updates to the data made on different devices that, when executed by the at least one processor, cause the at least one processor to:

generate at the device, with respect to a first update to the data at the device, a first data model including a first plurality of data nodes, wherein each of the first plurality of data nodes includes a first identifier and a first data value corresponding to one of a first plurality of data objects included the first update to the data, wherein each data node of the first plurality of data nodes is implemented as a respective conflict-free replicated data type (CRDT) and one or more of the first plurality of data nodes references another of the first plurality of data nodes;

receive from a second device, with respect to a second update to the data at the second device, the second update being independent of the first update, a second data model including a second plurality of data nodes, wherein each of the second plurality of data nodes includes a second identifier and a second data value corresponding to one of a second plurality of data objects included in the second update to the data, wherein each data node of the second plurality of data nodes is implemented as a respective conflict-free replicated data type (CRDT) and one or more of the second plurality of data nodes references another of the second plurality of data nodes;

generate a consistent data model based on the first and second data models by:

merging the first and second data values for a same data object for which the first identifier is equal to the second identifier, and merging the first and second data models such that the consistent data model includes data nodes having the merged first and second data values, and data nodes which are unique to the first or second data model; and generate a final update of the data based on the consistent data model.

12. The device of claim 11, wherein the instructions when executed by the at least one processor, further cause the at least one processor to:

for a target data node common to the first data model, the second model, and a third data model at a third device:

receive, at the device, a value update for the target data node such that a data value of the target data node is changed from a current data value to a new data value;

receive, from the second device, a deletion update of a target data object at the second device such that the target data node is removed from the consistent data model;

receive, from the third device, a duplication update of the target data object such that the target data node having the current data value is to be reinserted into the consistent data model;

responsive to the duplication update, detect reinsertion of the target data node having the current data value into the consistent data model; and responsive to the detection, identify the target data node as an inconsistent data node indicating uncertainty as to whether the reinserted target data node should have the current data value or the new data value in the consistent data model.

13. The device of claim 12, wherein the instructions when executed by the at least one processor, further cause the at least one processor to resolve the uncertainty based on respective globally-synchronized timestamps associated with the value update and the duplication update.

14. The device of claim 11, wherein the first and second data models each include a root node, the root node identifying the application, and each of the respective plurality of data nodes is directly or indirectly referenced by the root node.

15. The device of claim 11, wherein the first data model comprises a graph including edges that connect at least some of the first plurality of data nodes.

16. A computer program product comprising code, stored in a non-transitory computer-readable storage medium, the code comprising:

code to generate at a first device, with respect to a first update to data provided to an application at the first device, a first data model including a first plurality of data nodes, wherein each of the first plurality of data nodes includes a first identifier and a first data value corresponding to one of a first plurality of data objects included in the first update to the data, wherein each data node of the first plurality of data nodes is implemented as a respective conflict-free replicated data type (CRDT);

code to receive from a second device, with respect to a second update to the data provided to the application at the second device, the second update being independent of the first update, a second data model including a second plurality of data nodes, wherein each of the second plurality of data nodes includes a second identifier and a second data value corresponding to one of a second plurality of data objects included in the second update to the data, wherein each data node of the second plurality of data nodes is implemented as a respective conflict-free replicated data type (CRDT);

code to generate a consistent data model based on the first and second data models by:
- merging the first and second data values for a same data object for which the first identifier is equal to the second identifier, and
- merging the first and second data models such that the consistent data model includes data nodes having the merged first and second data values, and data nodes which are unique to the first or second data model; and code to generate a final update of the data based on the consistent data model.

17. The computer program product of claim 16, for a target data node common to the first data model, the second data model, and a third data model at a third device, the code further comprising:

code to receive, at the first device, a value update for the target data node such that a data value of the target data node is changed from a current data value to a new data value;

code to receive, from the second device, a deletion update of a target data object at the second device such that the target data node is removed from the consistent data model;

code to receive, from the third device, a duplication update of the target data object such that the target data node having the current data value is to be reinserted into the consistent data model;

code to, responsive to the duplication update, detect reinsertion of the target data node having the current data value into the consistent data model; and code to, responsive to the detection, identify the target data node as an inconsistent data node indicating uncertainty as to whether the reinserted target data node should have the current data value or the new data value in the consistent data model.

18. The computer program product of claim 17, the code further comprising code to resolve the uncertainty based on respective globally-synchronized timestamps associated with the value update and the duplication update.

19. The computer program product of claim 16, wherein the first and second data models each comprise a graph including a respective root node, the root node identifying the application, and each of the respective plurality of data nodes is directly or indirectly referenced by the root node.

20. The computer program product of claim 16, wherein the first identifiers are unique with respect to each other and the second identifiers are unique with respect to each other, and the first or second identifier corresponding to a data object that is included in both the first and second pluralities of data objects is unique with respect to the rest of the first and second identifiers.

* * * * *